US011898397B2

(12) United States Patent
Lygin

(10) Patent No.: US 11,898,397 B2
(45) Date of Patent: Feb. 13, 2024

(54) DOOR ACTUATOR LINKAGE

(71) Applicant: dormakaba Deutschland GmbH, Ennepetal (DE)

(72) Inventor: Konstantin Lygin, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 0 days.

(21) Appl. No.: 17/752,321

(22) Filed: May 24, 2022

(65) Prior Publication Data

US 2022/0381077 A1 Dec. 1, 2022

(30) Foreign Application Priority Data

May 31, 2021 (EP) .................................... 21176936

(51) Int. Cl.
*E05F 3/22* (2006.01)
*E05F 15/63* (2015.01)

(52) U.S. Cl.
CPC .............. *E05F 3/227* (2013.01); *E05F 15/63* (2015.01); *E05F 2003/228* (2013.01); *E05Y 2201/706* (2013.01); *E05Y 2400/654* (2013.01); *E05Y 2900/132* (2013.01)

(58) Field of Classification Search
CPC ..... E05F 3/227; E05F 15/63; E05Y 2900/132
See application file for complete search history.

(56) References Cited

U.S. PATENT DOCUMENTS 4,287,639 A * 9/1981 Denton .................... E05F 3/22 16/48.5
5,551,740 A * 9/1996 Lin ........................ E05F 3/221 292/262
8,209,816 B2 * 7/2012 Heger ...................... B60R 1/06 16/334
8,720,845 B2 * 5/2014 Courbon ............... B60R 1/0612 359/872
8,984,718 B2 * 3/2015 Ejdehag ................. F16C 11/10 16/436
9,926,970 B2 * 3/2018 Lang ...................... F16M 13/02
10,253,540 B2 * 4/2019 Bell ........................ E05F 15/63
10,260,673 B2 * 4/2019 Oginski ............... F16M 13/027
10,982,480 B2 4/2021 Lygin et al.
11,002,055 B2 * 5/2021 Eickhoff ................ E05F 3/227
11,447,995 B2 * 9/2022 Lygin ...................... E05F 15/63
11,707,018 B2 * 7/2023 Driscoll ............... A01D 34/001 56/229

(Continued)

FOREIGN PATENT DOCUMENTS

EP 2732117 B1 5/2019

*Primary Examiner* — Jason W San
(74) *Attorney, Agent, or Firm* — CANTOR COLBURN LLP

(57) ABSTRACT

A door actuator linkage includes a lever extending along a longitudinal axis, which merges into a linkage head with an offset, wherein the linkage head is formed for rotationally fixed mounting on an output shaft of a door actuator, wherein a free space for cable routing is formed by the offset. The free space is delimited by the linkage head and by an offset surface of the lever, wherein the lever protrudes up to an imaginary boundary surface, which is defined perpendicular to the longitudinal axis. The offset surface is withdrawn partially from this boundary surface in order to expand the free space.

17 Claims, 4 Drawing Sheets

(56) References Cited

U.S. PATENT DOCUMENTS

| | | | | |
|---|---|---|---|---|
| 2009/0025297 | A1* | 1/2009 | Hsu | E05F 3/22 49/341 |
| 2011/0257797 | A1* | 10/2011 | Burris | E05F 15/60 700/282 |
| 2014/0165329 | A1* | 6/2014 | Wildforster | E05F 3/227 16/71 |
| 2020/0340280 | A1* | 10/2020 | Oakley | E05F 3/227 |
| 2022/0275676 | A1* | 9/2022 | Lygin | E05F 3/02 |

* cited by examiner

DOOR ACTUATOR LINKAGE

CROSS-REFERENCE TO RELATED APPLICATIONS

This application is related to and claims the benefit of European Patent Application No. 21176936.9, filed on May 31, 2021, the contents of which are herein incorporated by reference in their entirety.

TECHNICAL FIELD

The disclosure relates to a door actuator linkage for mounting on an output shaft of a door actuator. The disclosure also discloses a door actuator assembly and a revolving door assembly, which each comprise the door actuator linkage.

BACKGROUND

Door closers and door drives are known from the prior art which are designated jointly as door actuators. Door closers have a force storage mechanism, for example a spring. This force storage mechanism is charged when the door is opened manually by a person. The force storage mechanism is discharged when the door is closed. There are also door closers in the prior art with a servo drive, which assists the charging of the force storage mechanism when the door is opened. In contrast, door drives have an electric or hydraulic drive, which applies the full force to open and/or close a door. In addition to the drive, a force storage mechanism can be used in the door drive.

Door actuators usually have an output shaft. The output shaft is connected to a door actuator linkage in a rotationally fixed manner. When the door actuator is mounted on a door leaf, the door actuator linkage transfers the force to the frame or wall. If, in contrast, the door actuator is fastened to the frame or wall, then the linkage transfers the force to the door leaf. In the case of different applications, cable routing is desirable through the door actuator linkage or along the door actuator linkage. One or a plurality of cables can be laid along the cable routing for data transfer and for power supply. For example, a drive in the door actuator can thus be supplied with power and/or actuated. However, even when the door actuator is mounted on the wall or frame, a power supply, for example of a door lock, can take place via the cable routing; similarly, it is possible to exchange data with the door actuator, door lock or another element on the door leaf via the cable routing.

SUMMARY

The present disclosure indicates a door actuator linkage, which enables operationally-safe and low-maintenance operation of doors with a simple design. In particular, the door actuator linkage should enable safe cable routing.

This is achieved by providing the features of the independent claims. The dependent claims have advantageous configurations of the disclosure as their subject matter.

The disclosure provides a door actuator linkage with a lever and a linkage head. The lever extends along a longitudinal axis. In particular, the longitudinal axis sits centrally in the lever. One end of the lever is for example connected to a slide piece, which is guided in a slide rail. Alternatively, this end of the lever can also be rotatably connected to another lever such that these two levers together form a scissors linkage. The other end of the lever merges with an offset into the linkage head of the door actuator linkage.

The linkage head is formed for rotationally fixed mounting on an output shaft of a door actuator. In particular, the linkage head is inserted on the output shaft of a door actuator and, as a result, is connected to the output shaft in a rotationally fixed manner. A shaft axis of the output shaft of the door actuator is defined for the description of the disclosure. The position and alignment of the shaft axis also emerges from the design of the linkage head. The door actuator can essentially be a door closer, servo door closer or door drive.

A shoulder results from the offset between the lever and the linkage head. When the door actuator is mounted on the door leaf, the lever extends beyond the door leaf up to the output shaft of the door actuator. The door actuator or the output shaft are usually located somewhat lower than the upper edge of the door leaf. As a result, the shoulder resulting from the offset engages behind the door leaf.

A free space, which is formed according to the disclosure for cable routing, also results from the offset at the same time as the shoulder. In particular, the door actuator linkage comprises at least one cable and this cable runs through the free space.

The free space is delimited by the linkage head and by an offset surface of the lever. The offset surface of the lever is in particular a surface facing the shaft axis. In particular, the offset surface results from lever ending in the region of the offset or being bent downwards. The offset surface in particular merges into the upper side of the linkage head.

When the door actuator is mounted on the door leaf, the output shaft to be used protrudes upwards from the door actuator. Accordingly, the linkage head is located above the door actuator. The free space defined here is therefore delimited on its underside by the linkage head. The offset surface forms a lateral boundary. The free space can theoretically remain open upwards, i.e. on the side opposite the linkage head. However, it is preferably provided that a corresponding free space cladding completes the free space on the upper side.

The offset surface forms a boundary of the free space only on one side. Another side, which is in particular semicircular, can be defined by a corresponding radial cladding.

The elements described here, "lever" and "linkage head" in particular describe only the corresponding supporting components of the door actuator linkage. The lever and/or the linkage head can be surrounded completely or partially by a cladding. In particular, the lever and the linkage head are manufactured from metal. The lever and the linkage head can be manufactured in one piece or be two components connected to one another. The surrounding cladding is in particular manufactured from plastic, but can also be manufactured from a sheet metal. Radial cladding, free space cladding and lever cladding are mentioned when describing the position of the cladding in the context of the disclosure. These claddings can be connected to one another in one piece or represent separate components. The lever cladding is in particular located on one or a plurality of sides of the lever. As will be described in detail, a cable channel can be formed in the lever and/or between the lever and its lever cladding and/or in the lever cladding. The at least one cable guided through the free space is guided further in this cable channel along the lever and therefore parallel to the longitudinal axis. The cable or a corresponding further cable is preferably guided from the free space parallel to the shaft axis in the direction of the door actuator and is preferably connected to an electronic system and/or electric system in the door actuator.

When using the door actuator linkage on a door actuator, the linkage head along with the lever rotates together with the output shaft relative to the remaining components of the door actuator; depending on the application, a rotational movement of up to 180° can occur here. The at least one cable is moved or bent in the free space by this rotational movement. In order to enable bend radii of the cable that are as large as possible in the free space, the free space is preferably designed as large as possible. In particular, this relates to the extension of the free space in a plane perpendicular to the shaft axis. At the same time however, the size of the free space is restricted by the offset. The offset must namely be positioned as close as possible to the linkage head such that the shoulder resulting from the offset is also positioned as close as possible to the linkage head or to the shaft axis and can therefore engage behind the door leaf. Furthermore, the door actuator linkage must be formed sufficiently stably at the transition from the lever to the linkage head in order to transfer the corresponding forces.

An imaginary boundary surface is preferably defined for the further configuration of the offset. This imaginary boundary surface is perpendicular to the longitudinal axis of the lever. The boundary surface is in particular vertical and therefore parallel to the shaft axis. The lever protrudes in the direction of the linkage head or in the direction of the shaft axis up to this imaginary boundary surface. The end of the lever facing the linkage head therefore defines the position of this imaginary boundary surface. In particular, the offset surface of the lever, i.e. the surface laterally delimiting the free space, protrudes up to this imaginary boundary surface. In the case of a maximally large configuration of the lever and therefore in the case of a configuration that is optimal in regards to the stability, the lever would protrude with its entire offset surface up to this boundary surface. In the context of the disclosure, it is preferably provided that the offset surface is withdrawn partially from the boundary surface in order to thus expand the free space. The lever, in particular the offset surface, therefore protrudes at least with a tip up to the boundary surface. However, the entire offset surface does not overlap with the imaginary boundary surface, but rather only at least one point of the offset surface.

In an alternative wording, it is defined that the offset surface is preferably not perpendicular to the longitudinal axis of the lever over its entire region.

Moreover, it is preferably defined that the upper side of the lever is higher than the upper side of the linkage head and this height difference determines the height of the free space. The offset surface preferably merges, on one side, into the upper side of the linkage head and, on the other side, into the upper side of the lever. Furthermore, it is preferably provided that the underside of the linkage head, i.e. the side facing the door actuator, is lower than the underside of the lever.

It is preferably provided that the offset surface has an oblique section. The oblique section can extend over the entire offset surface such that the entire offset surface is formed obliquely. Alternatively, it is also possible that the oblique section extends only over one part of the offset surface and therefore only one part of the offset surface is formed obliquely. This is to be understood as an oblique design with corresponding angles deviating from 90° in relation to the longitudinal axis of the lever. The oblique section is preferably oblique in relation to the imaginary boundary surface in such manner that the free space is enlarged over its entire height (defined parallel to the shaft axis) by the oblique configuration. An oblique transition from the upper side of the lever to the upper side of the linkage head that is inclined to the shaft axis is in particular not regarded as an "oblique section".

The offset surface preferably adopts an angle $\alpha$ with respect to the longitudinal axis in the oblique section. An upper limit of the angle $\alpha$ is preferably 89°, more preferably 80°, particularly preferably 75°. Additionally or alternatively, a lower limit of the angle $\alpha$ is preferably 30°, more preferably 40°, particularly preferably 45°. Through these angle ranges, an appropriate balance is struck between a stable connection of lever and linkage head and a configuration of the free space that is as large as possible.

It is preferably defined that the oblique section of the offset surface extends from an acute angled end to an obtuse angled end. The acute angled end of the oblique section is preferably closer to the boundary surface than the obtuse angled end. If the oblique section extends over the entire offset surface, it is preferably provided that the acute angled end contacts the boundary surface.

As already described, a cable channel is preferably located in and/or on the lever. This cable channel preferably opens at the obtuse angled end of the oblique section into the free space.

The cable channel preferably runs horizontally laterally to the longitudinal axis in the lever or next to the lever. Horizontally laterally means that the cable channel preferably does not run over or under the lever, but rather next to the lever. As a result, a design of the lever that is as structurally low as possible is ensured.

Additionally or alternatively to the oblique section, the offset surface can have a convex abutment section. The cable can abut on this section or the cable can be bent around this section. In particular, the abutment section comes into contact with the cable only in the case of a relatively large rotational movement in one of the two rotational directions. The abutment section can be formed by an additional element, which is connected to the linkage head and/or to the lever and, as a result, forms a section of the offset surface. However, the abutment section can also be formed by an integral component of the lever.

The cable routing takes place in the direction of the door actuator from the free space. In particular, the cable is guided laterally past the linkage head. To this end, a pivot member is preferably used. This pivot member is formed for connecting to the door actuator in a rotationally fixed manner. As a result, the door actuator linkage along with the output shaft rotates relative to this pivot member. The pivot member is in particular positioned radially outside of the linkage head. Cable routing deflected by 90° preferably takes place from the free space into the door actuator via the pivot member. The cable can thereby be guided through the pivot member. The cable can alternatively also be connected to the pivot member, wherein another cable or another line leads to the door actuator from the pivot member.

It is preferably provided that the linkage head, therefore also the lever and the output shaft, are rotatable relative to the pivot member by at least 135°, preferably by at least 180°. The free space must be formed correspondingly large in order to enable a sufficiently large bend radius for the cable in the free space in the case of this large angle of rotation.

As described, the pivot member is preferably located radially outside of the linkage head. Furthermore, the radial cladding is preferably located radially outside of the pivot member such that the pivot member is arranged between radial cladding and linkage head.

A form closure element is preferably located on the side of the linkage head facing away from the free space. This form closure element enables the rotationally fixed connection to the output shaft. In particular, the form closure element is an inner polygonal edge which is inserted on the outer polygonal edge of the output shaft.

The form closure element is preferably releasable from the remaining component of the linkage head in a non-destructive manner and therefore interchangeable and/or rotatable. It is preferably provided that the form closure element is fastenable on the linkage head in different rotational positions relative to the linkage head.

The lever and the linkage head can be manufactured in one piece, for example by a bent metal piece. In this case, the offset is formed in particular by a bent edge that is oblique to the longitudinal axis.

Alternatively, the lever and the linkage head are two components welded together. The lever particularly preferably overlaps with the linkage head, wherein one end of the lever forms the offset surface and one end of the linkage head forms the shoulder.

It is in particular provided that the lever and the linkage head are welded flat in the overlap. A material accumulation, which is connected in a form-fitting manner to the two overlapping surfaces of lever and linkage head via resistance welding, is positioned in particular between the lever and the linkage head.

The disclosure also comprises a door actuator assembly. The advantageous configurations presented as part of the door actuator linkage and the dependent claims listed for the door actuator linkage are advantageously accordingly applicable to the door actuator assembly.

The door actuator assembly comprises a door actuator with an output shaft and the door actuator linkage, wherein the linkage head is formed for rotationally fixed mounting on the output shaft. The linkage head is preferably mounted on the output shaft in a rotationally fixed manner.

The disclosure also comprises a revolving door assembly. The advantageous configurations presented as part of the door actuator linkage and the dependent claims listed for the door actuator linkage are advantageously accordingly applicable to the revolving door assembly.

The revolving door assembly comprises the previously described door actuator assembly and a door leaf, wherein the door actuator is mounted on the door leaf and the door actuator linkage is formed for mounting on the frame or wall, wherein a shoulder formed by the offset engages behind the door leaf. The lever thus protrudes from the frame or wall over the upper edge of the door leaf and extends through its offset somewhat downwards in order to thus connect to the output shaft of the door actuator. A shoulder, which engages behind the door leaf on the side of the door actuator, thereby results from the offset.

BRIEF DESCRIPTION OF THE DRAWINGS

The disclosure will now be described further on the basis of an exemplary embodiment, in which is shown.

DETAILED DESCRIPTION OF THE DRAWINGS

A revolving door assembly 200 having a door actuator assembly 100 together with door actuator linkage 1 is described in detail below on the basis of all figures.

Figure 1:
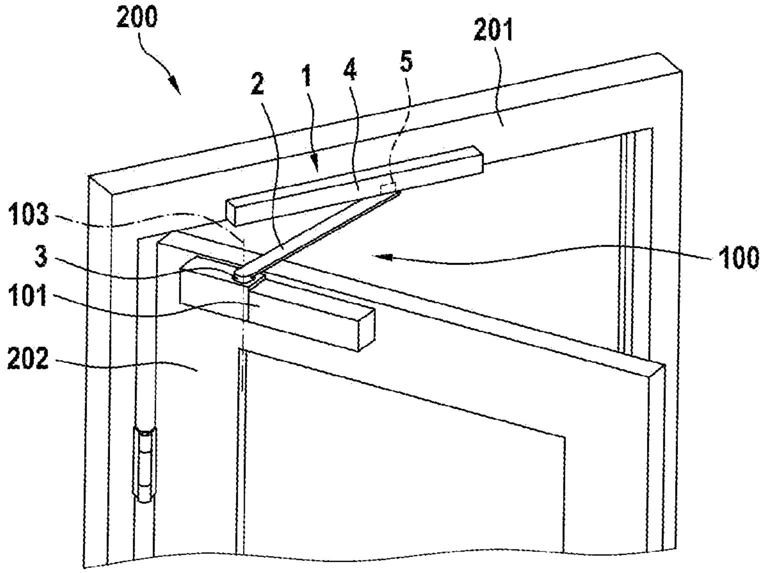
FIG. 1 a revolving door assembly according to the disclosure having a door actuator assembly according to the disclosure and a door actuator linkage according to the disclosure in accordance with an exemplary embodiment, FIG. 2 a side view for representation from FIG. 1, FIGS. 3 and 4 a detail of the door actuator linkage according to the disclosure in accordance with the exemplary embodiment in different rotational positions, FIG. 5 another detail of the door actuator linkage according to the disclosure in accordance with the exemplary, FIG. 6 a linkage head of the door actuator linkage according to the disclosure in accordance with the exemplary embodiment, and FIG. 7 a detail of the linkage head of the door actuator linkage according to the disclosure in accordance with the exemplary embodiment.

FIG. 1 shows a revolving door assembly 200 having a frame 201 and a door leaf 202 accommodated in the frame 201 in a rotationally movable manner. The revolving door assembly 200 also comprises the door actuator assembly 100.

The door actuator assembly 100 comprises a door actuator 101 having an output shaft 102, formed here as a door drive. The output shaft 102 rotates about a shaft axis 103. The door actuator 101 is fastened on the door leaf 202. The door actuator assembly 100 also has the door actuator linkage 1. In the example shown, the door actuator linkage 1 comprises a lever 2, which is connected to a slide piece 5 in a rotationally movable manner. The slide piece 5 is guided in a slide rail 4 in a linearly movable manner. The slide rail 4 is fastened on the frame 201.

The detailed structure of the door actuator linkage 1 emerges in particular from FIGS. 2 to 7.

The lever 2 merges into the linkage head 3 with an offset 6. A free space 9 results from this offset 6. The shaft axis 103 runs through this free space 9 since the free space 9 is located over the output shaft 102.

An underside of the free space 9 is delimited by the upper side of the linkage head 3. An offset surface 7 forms a lateral boundary of the free space 9. This offset surface 7 results from the offset 6. In the exemplary embodiment shown, the offset surface 7 is formed by an end face side of the lever 2 facing the shaft axis 103.

Figure 2:
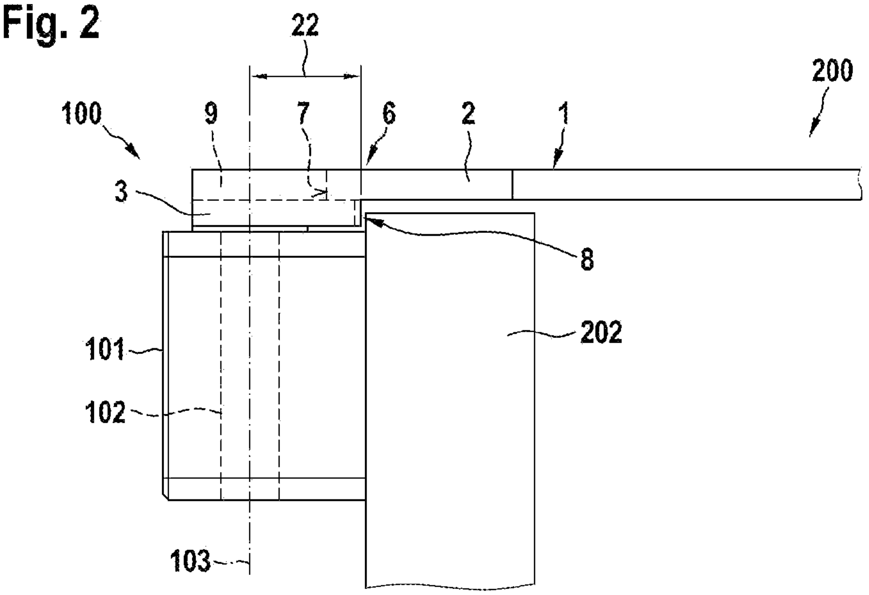

The offset 6 results in the offset surface 7 on the one side and results in a shoulder 8 on the opposing lower side of the door actuator linkage 1 in the example shown. As the representation in FIG. 2 shows, the lever 2 protrudes over the door leaf 202 and extends downwards through the offset 6 with the linkage head 3 to enable a connection to the output shaft 102. The shoulder 8 thereby engages behind the door leaf 202.

Figure 3:
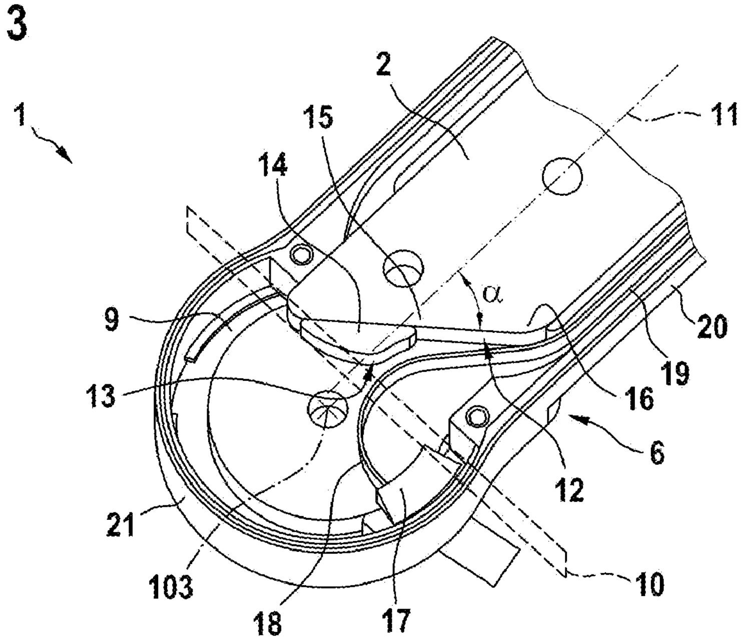
Figure 5:
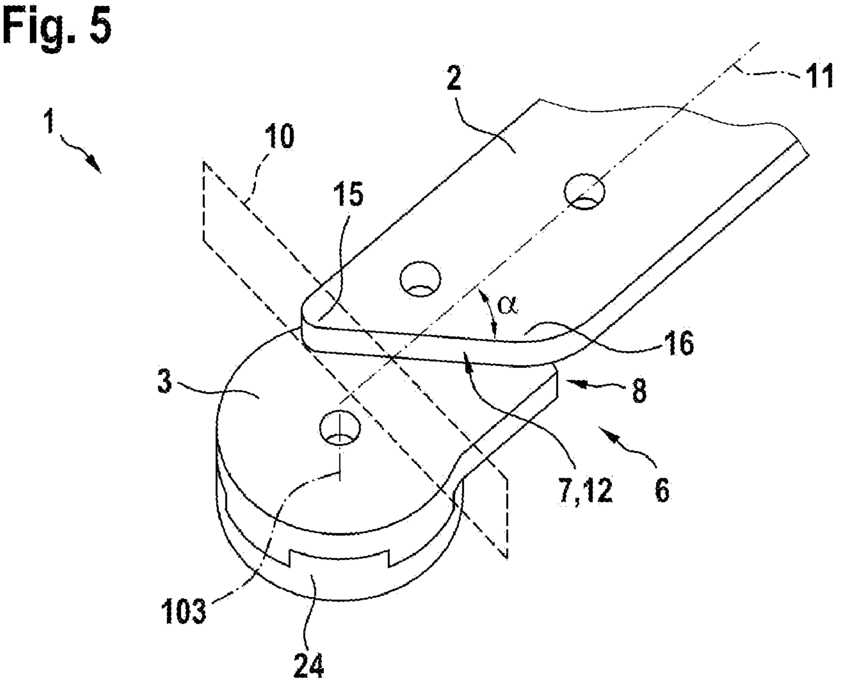

For example, FIGS. 3 and 5 show an imaginary boundary surface 10. This imaginary boundary surface 10 is perpendicular to a longitudinal axis 11 of the lever 2 and parallel to the shaft axis 103. At the same time, the foremost end of the lever 2 or of the offset surface 7 defines the position of this imaginary boundary surface 10. The offset surface 7 is withdrawn from the boundary surface 10 in order to thus configure the free space 9 to be as large as possible.

In the exemplary embodiment shown, the offset surface 7 is formed with an oblique section 12 obliquely to the longitudinal axis 11 and thereby adopts an angle $\alpha$ of approx. 35°. This oblique section 12 extends from an acute angled end 15 to an obtuse angled end 16.

Figure 4:
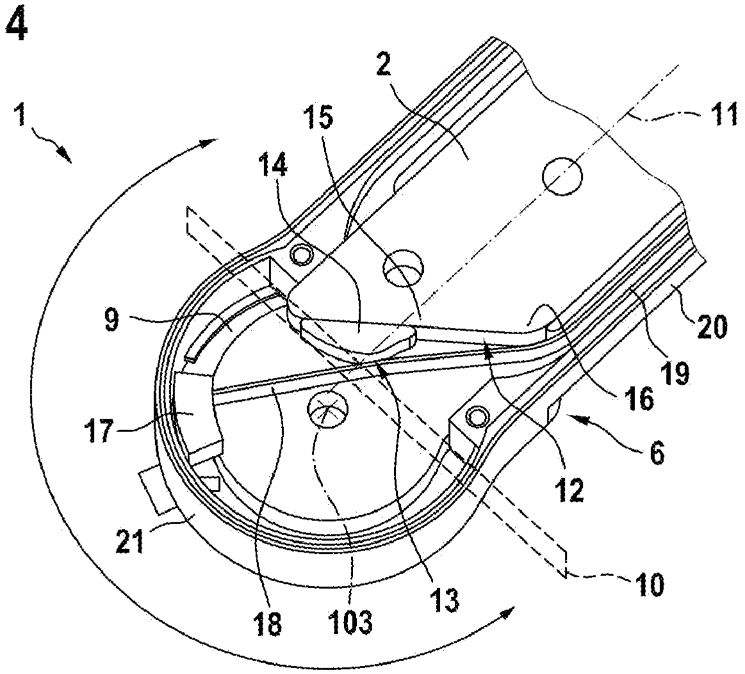

FIGS. 3 and 4 show a variant, in which the offset surface 7 has an oblique section 12 and an abutment section 13. The abutment section 13 is formed by an additional element 14 in the construction shown. This additional element 14 is to be assigned to the lever 2. The abutment section 13 can also be formed by an integral portion of the lever.

FIG. 5 shows that the entire offset surface 7 can also be formed by the oblique section 12 such that the acute angled end 15 of the oblique section 12 protrudes up to the imaginary boundary surface 10.

The advantage of the abutment section 13 in its convex configuration emerges when viewing FIGS. 3 and 4. These figures show guidance of a cable 18 through the free space 9. The door actuator linkage 1 can be rotated relative to the door actuator 101 by up to 180°. Such a rotation is discernible when viewing FIGS. 3 and 4. The cable 18 comes into contact with the abutment section 13 in the case of the rotation represented in FIG. 4 and in the case of an even further rotation. Through the concave configuration of the abutment section 13, a defined bending is predefined with the largest possible radius of the cable 18.

FIGS. 3 and 4 illustrate that a cable channel 19 is formed laterally offset to the longitudinal axis 11 next to the lever 2. The cable 18 runs through this cable channel 19. The cable channel 19 is located inside a lever cladding 20.

The cable channel 19 opens into the free space 9 at the obtuse angled end 16.

FIGS. 3 and 4 also show that the door actuator linkage 1 comprises a pivot member 17. This pivot member 17 is fixedly connected to the door actuator 101 and serves to divert the cable routing from the substantially horizontal cable routing in the free space 9 to a perpendicular routing in the direction of the door actuator 101.

The pivot member 17 is located radially outside of the linkage head 3 and radially inside of a radial cladding 21. This radial cladding 21 surrounds the linkage head 3 and laterally delimits the free space 9, in addition to the offset surface 7.

An upper side of the free space 9 opposite the linkage head 3 can be closed by a free space cladding, which is not represented. This free space cladding then forms the upper boundary of the free space 9. The upper side of the lever 2 can also be clad accordingly.

Figure 6:
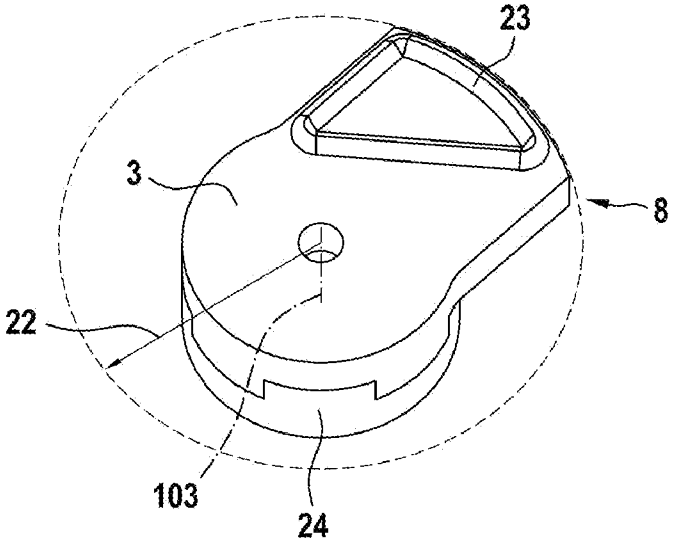

FIG. 6 illustrates a radial distance 22, measured perpendicular to the shaft axis 103, from the shaft axis 103 to the outer edge of the linkage head 3. This radial distance 22 must be configured to be correspondingly small since otherwise the shoulder 8 (see FIG. 2) would collide with the door leaf 202. Therefore, the overlap surface between lever 2 and linkage head 3 is also delimited. FIG. 6 illustrates that a material accumulation 23 is applied on the linkage head 3. At this point, an overlap of lever 2 and linkage head 3 and welding of these two elements, in particular a flat welding by a resistance welding method takes place.

Figure 7:
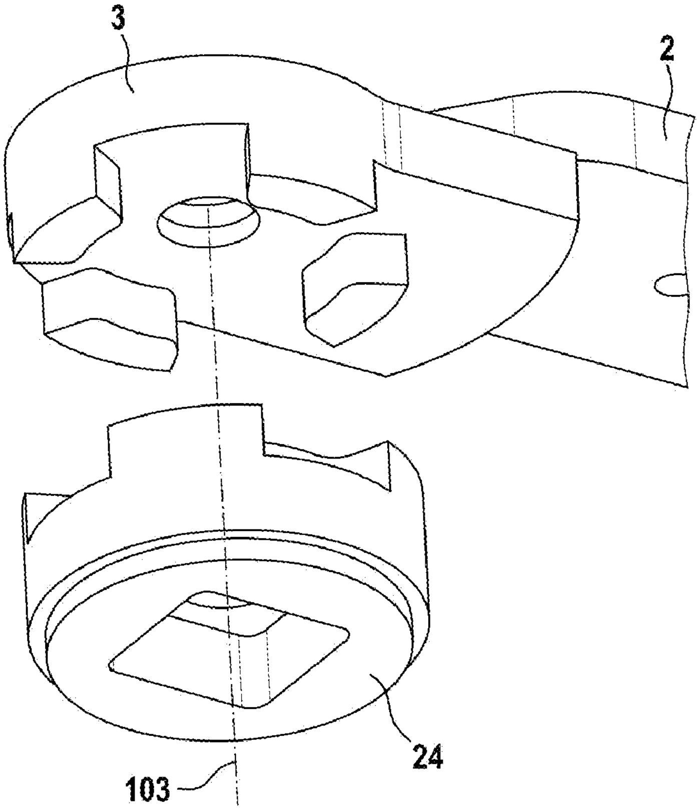

FIGS. 5, 6 and 7 show that the linkage head 3 has a form closure element 24. This form closure element 24 comprises an inner polygonal edge for inserting on the output shaft 102.

FIG. 7 illustrates that the form closure element 24 is releasable from the remaining component of the linkage head 3 in a non-destructive manner. As a result, the form closure element 24 is interchangeable and/or mountable on the linkage head 3 in different rotational positions relative to the linkage head 3.

The invention claimed is:

1. A door actuator linkage, comprising:

a lever extending along a longitudinal axis, which merges into a linkage head with an offset, wherein the linkage head is formed for rotationally fixed mounting on an output shaft of a door actuator, wherein a free space for cable routing is formed by the offset, and the free space is delimited by the linkage head and by an offset surface of the lever, wherein the lever protrudes up to an imaginary boundary surface, which is defined perpendicular to the longitudinal axis, and wherein the offset surface is withdrawn partially from this boundary surface to expand the free space.

2. The door actuator linkage according to claim 1, wherein the offset surface has an oblique section, which extends over the entire offset surface or a part of the offset surface.

3. The door actuator linkage according to claim 2, wherein the offset surface adopts an angle in the oblique section with respect to the longitudinal axis, wherein an upper limit of the angle is 89°, and/or a lower limit of the angle is 30°.

4. The door actuator linkage according to claim 2, wherein the oblique section extends from an acute angled end to an obtuse angled end and wherein the acute angled end is closer to the boundary surface than the obtuse angled end.

5. The door actuator linkage according to claim 1, wherein at least one cable channel is formed in the lever and/or between the lever and a lever cladding surrounding the lever and/or in the lever cladding.

6. The door actuator linkage according to claim 4, wherein the cable channel opens into the free space at the obtuse angled end.

7. The door actuator linkage according to claim 5, wherein the cable channel runs horizontally laterally to the longitudinal axis.

8. The door actuator linkage according to claim 1, wherein the offset surface has a convex abutment section, which extends over a part of the offset surface and is formed for the abutment of a cable.

9. The door actuator linkage according to claim 1, further comprising:

a pivot member, which is formed for stationary mounting on the door actuator and is rotatable relative to the linkage head, and a cable, which runs through the free space up to the pivot member, wherein the linkage head is rotatable relative to the pivot member by at least 135°.

10. The door actuator linkage according to claim 9, wherein the pivot member is arranged radially outside of the linkage head and inside of a radial cladding surrounding the linkage head.

11. The door actuator linkage according to claim 1, wherein the free space is delimited by a free space cladding on the side opposite the linkage head.

12. The door actuator linkage according to claim 1, wherein a form closure element is arranged on the side of the linkage head facing away from the free space, wherein the form closure element is formed for the form-fitting connection to the output shaft.

13. The door actuator linkage according to claim 1, wherein the lever overlaps with the linkage head and is welded flat at the overlap.

14. The door actuator linkage according to claim 1, wherein the lever is rotatably connected to another lever to form a scissors linkage.

15. The door actuator assembly according to claim 1, further comprising a slide rail and a slide piece guided linearly in the slide rail, wherein the lever is connected to the slide piece in a rotationally movable manner.

16. A door actuator assembly, comprising a door actuator with an output shaft and a door actuator linkage according to claim 1, wherein the linkage head is formed for rotationally fixed mounting on an output shaft.

17. A revolving door assembly comprising a door actuator assembly according to claim 16 and a door leaf, wherein the door actuator is mounted on the door leaf and the door actuator linkage is formed for mounting on the frame or wall, and wherein a shoulder formed by the offset engages behind the door leaf.

* * * * *